United States Patent [19]

Ito

[11] Patent Number: 5,065,934

[45] Date of Patent: Nov. 19, 1991

[54] METHOD OF MANUFACTURING ROD END JOINT

[75] Inventor: Kenichi Ito, Kani, Japan

[73] Assignee: Nippon Thompson Co., Ltd., Tokyo, Japan

[21] Appl. No.: 523,381

[22] Filed: May 14, 1990

[30] Foreign Application Priority Data

May 16, 1989 [JP] Japan .................................. 1-121886

[51] Int. Cl.⁵ ...................... B23K 20/12; B23K 31/02; B21D 53/84

[52] U.S. Cl. ..................................... 228/112; 228/125; 228/155; 29/888.091; 29/888.092; 29/888.2

[58] Field of Search ............... 228/112, 113, 114, 125, 228/155; 29/888.091, 888.092, 888.2, 898.53

[56] References Cited

U.S. PATENT DOCUMENTS

| | | | |
|---|---|---|---|
| 2,975,775 | 3/1961 | Macura | 29/888.2 |
| 3,965,554 | 6/1976 | Amos | 228/112 X |
| 4,796,799 | 1/1989 | Rasi-Zade et al. | 228/155 |

FOREIGN PATENT DOCUMENTS

| | | | |
|---|---|---|---|
| 249802 | 6/1963 | Australia | 29/888.091 |
| 190923 | 8/1988 | Japan . | |

*Primary Examiner*—Kenneth J. Ramsey
*Attorney, Agent, or Firm*—Rogers & Killeen

[57] ABSTRACT

There is provided an improved method of manufacturing a rod end joint comprising a rod and one or more ball sections formed at an end or ends of the rod. Said method comprises the steps of rigidly fitting a ball or balls to the end or ends of the rod to form the ball section; and applying external compressive force longitudinally to a neck portion formed with the ball section while the neck portion is subjected to a high frequency annealing so as to plastically deform said rod. A length of the rod before the ball is fitted is greater than a length of the rod of a final product.

6 Claims, 5 Drawing Sheets

METHOD OF MANUFACTURING ROD END JOINT

BACKGROUND OF THE INVENTION

This invention relates to an improved method of manufacturing a rod end joint having a rod and one or more ball sections arranged at an end or ends of the rod.

Japanese Patent Laid-open No. 63-190923 teaches a method of manufacturing a ball joint. According to this method, a ball is welded to each of the longitudinal ends of a rod having a length smaller than that of the final product and then the distance between the centers of the balls at the ends of the rod is adjusted by elongating the rod so as to produce a rod end joint.

According to this known method, however, it is not possible to accurately adjust the distance between the centers of the balls at the ends of the rod, because adjustment of the distance between the centers of the balls depends solely on press technique.

Moreover, according to this technique, since a cylindrical straight portion of the rod is slenderized by rotating, a diameter of the rod is not uniform and the rod has an uneven strength.

SUMMARY OF THE INVENTION

Therefore, an object of the present invention is to provide a method of manufacturing a rod end joint without the above described drawbacks.

According to the present invention, the above object is achieved by providing a method of manufacturing a rod end joint comprising a rod and one or more ball sections formed at an end or ends of the rod, said method comprising steps of rigidly fitting a ball or balls to the end or ends of the rod to form the ball section; and applying external compressive force longitudinally to a neck portion formed with the ball section while the neck portion is subjected to a high frequency annealing so as to plastically deform said rod. A length of the rod before the ball is fitted is greater than a length of the rod of a final product.

According to the present invention, a rod end joint having one or two ball sections with accurate dimensions can be obtained Moreover, such a rod end joint does not have uneven strength.

DESCRIPTION OF PREFERRED EMBODIMENTS

Now, the present invention will be described in greater detail by referring to preferred embodiments indicated in the attached drawings.

FIGS. 1 to 4 illustrate a first preferred embodiment of the invention which relates to a method for manufacturing a rod end joint 11 by forming a pair of ball sections 2, 2 at the opposite longitudinal ends of a rod 1.

Figure 1:
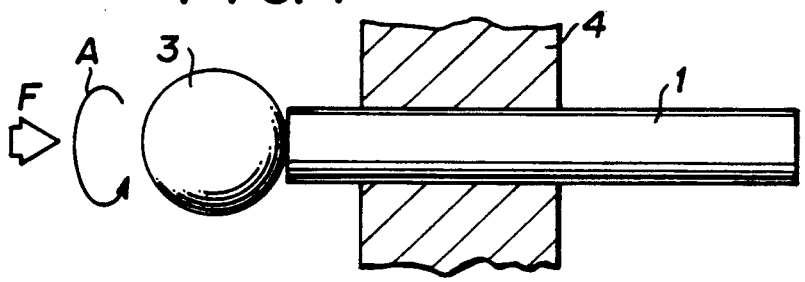
FIG. 1 illustrates a first embodiment of the invention in longitudinal section, showing a step of fitting a ball to a longitudinal end of the rod.

FIG. 1 illustrates a step of fitting a ball 3 rigidly to one end of the rod 1 by means of frictional welding technique. The rod 1 is firmly fastened to an anchoring member 4 and the ball 3 is moved to abut to a longitudinal end of the rod 1. Then, while the ball is rotated as indicated by arrow A, external force F is applied between the ball 3 and the rod 1 so that heat is generated by friction at the abutment. By this heat, the ball 3 is welded to the rod 1 to form a ball section 2 of a rod end joint.

Figure 2:
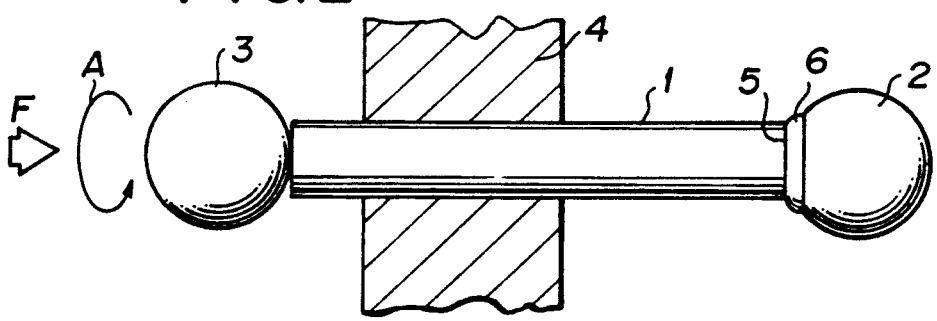
FIG. 2 is a sectional view of the first embodiment, showing a step of fitting another ball to the other longitudinal end of the rod.

FIG. 2 shows a step of fitting another ball 3 rigidly to the other end of the rod 1. In the illustrated embodiment, the ball 3 is frictionally welded to the other end of the rod 1 formed with a ball section 2 at the opposite end. The technique for welding the ball 3 to the rod 1 is same as the one as described above by referring to FIG. 1.

Relating to a length of the rod 1 before the balls 3, 3 are fitted thereto, a distance between the centers of the balls 3, 3 is slightly longer than a length $L_1$ (FIG. 4) between the ball sections 2, 2 of a final product. For example, if $L_1$ is 40 mm, the original length of the rod is longer than $L_1$ by approximately 0.1 mm.

Means for fitting the balls 3, 3 to the rod 1 is not limited to frictional welding and any other equivalent technique such as ordinary welding can be employed.

When the ball 3 is frictionally welded to the rod 1, bulges 6 are usually formed at neck portions 5, 5 at which ball sections 2, 2 are firmly connected to the ends of the rod 1.

Although balls 3, 3 are welded one by one to the rod 1 in the above description, alternatively they may be simultaneously welded thereto.

Figure 3:
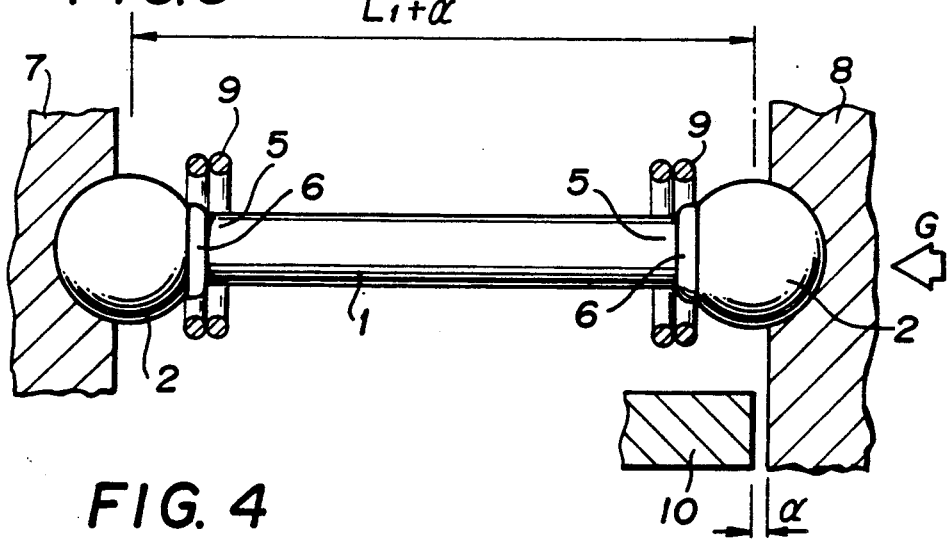
FIG. 3 is another sectional view of the first embodiment, showing a step of applying a high frequency annealing to a neck portion formed with a ball section at the ends of the rod, and a compressive force to the neck portion to plastically deform the same.
Figure 4:
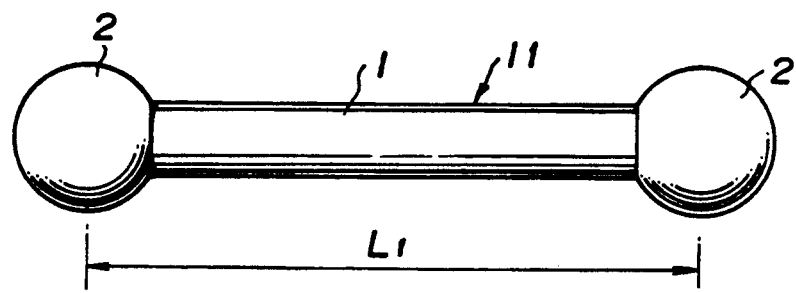
FIG. 4 is a front view of the rod end joint manufactured according to the first embodiment.

FIG. 3 schematically illustrates a step in which while the neck portions 5, 5, are subjected to high frequency annealing, compressive external force G is applied to the neck portions 5, 5 to axially compress and plastically deform the neck portions 5, 5 so as to adjust the dimensions of the product. In this step, the length between the centers of the ball sections 2, 2 of the product is reduced to $L_1$ as shown in FIG. 4 from $L_1 + \alpha$ as shown in FIG. 3.

This step is usually carried out in the following manner. Firstly, the ball sections 2, 2 of the half-finished rod end joint having the length of $L_1 + \alpha$ are supported by a fixed press member 7 and a movable press member 8, respectively. High frequency heating coils 9, 9 are arranged near the respective neck portions 5, 5. The temperature for heating the neck portions 5, 5 by the high frequency heater is preferably slightly lower than the transformation temperature of the material of the rod 1. Thus, for example, when the rod 1 is made of steel, the neck portions 5, 5 are heated at temperature between 670° and 720° C., which is only slightly lower than the transformation temperature of steel, so that the neck portions 5, 5 become soft. Compressive external force G is axially applied between the ball section 2 and the rod 1 under this condition, it is easy to adjust the dimensions accurately so that the desired length of $L_1$ between the centers of the ball sections 2, 2 can be obtained.

Before the above-described annealing of the neck portions 5, 5, the distance between the centers of the ball sections 2, 2 is $L_1 + \alpha$ as shown in FIG. 3. A stopper 10 is arranged at the press member 8 with clearance $\alpha$. When the distance is decreased by application of compressive force to the neck portions 5, 5 and $\alpha = 0$ is achieved, the stopper 10 abuts to the press member 8 so that a product having distance $L_1$ between the centers of the ball sections is obtained.

Although the stopper 10 is used as means for limiting the movement of said movable press member 8, it may be replaced by any other appropriate means such as a sensor that controls the movement of the movable press member 8 by determining if desired distance $L_1$ is reached or not.

Finally, bulges 6, 6 formed during the process of frictional welding is removed to form a finished rod end joint as illustrated in FIG. 4. This step of removing of bulges can be performed immediately after the above described annealing process. The bulges 6, 6 can be removed by means of a known technique such as milling.

A machine illustrated in FIGS. 7 to 10 can be used in the above described first embodiment of the invention. However, the present invention is not limited to the use of the machine.

When the machine as illustrated in FIGS. 7 to 10 is used, the rod 1 is clamped by a chuck 41 of a known type which is fitted to an upper end of a movable member 81. Said movable member 81 can be moved upward and downward along rails 83 by means of a cylinder 82. Said movable member 81 is provided with a stopper abutting member 84.

Then, the ball 3 is rigidly clamped by a ball holder 71 which is a known ball chuck of a collet chuck type. Said ball holder 71 is fitted to a ball revolver 72 which is arranged in a drive member 73. Said ball revolver 72 is engaged with a motor (not shown) so that the revolver is rotationally driven by the motor. The ball 3 is rotated by rotating the ball revolver 72. Stationary frame 74 to which the drive member 73 is secured is provided with a stopper 10, which is a bolt projecting downward from the lower surface of a bracket 75 so that its vertical position can be adjusted.

The rod 1 is moved upward by means of the cylinder 82 until its upper end abuts to the ball 3. Then, while the ball is rotated by the ball revolver 72, the rod 1 is pressed against the ball 3 by means of the cylinder 82 to frictionally weld the ball 3 to the upper end of the rod 1 to form the ball section 2 as an integral part of the rod 1.

Figure 7:
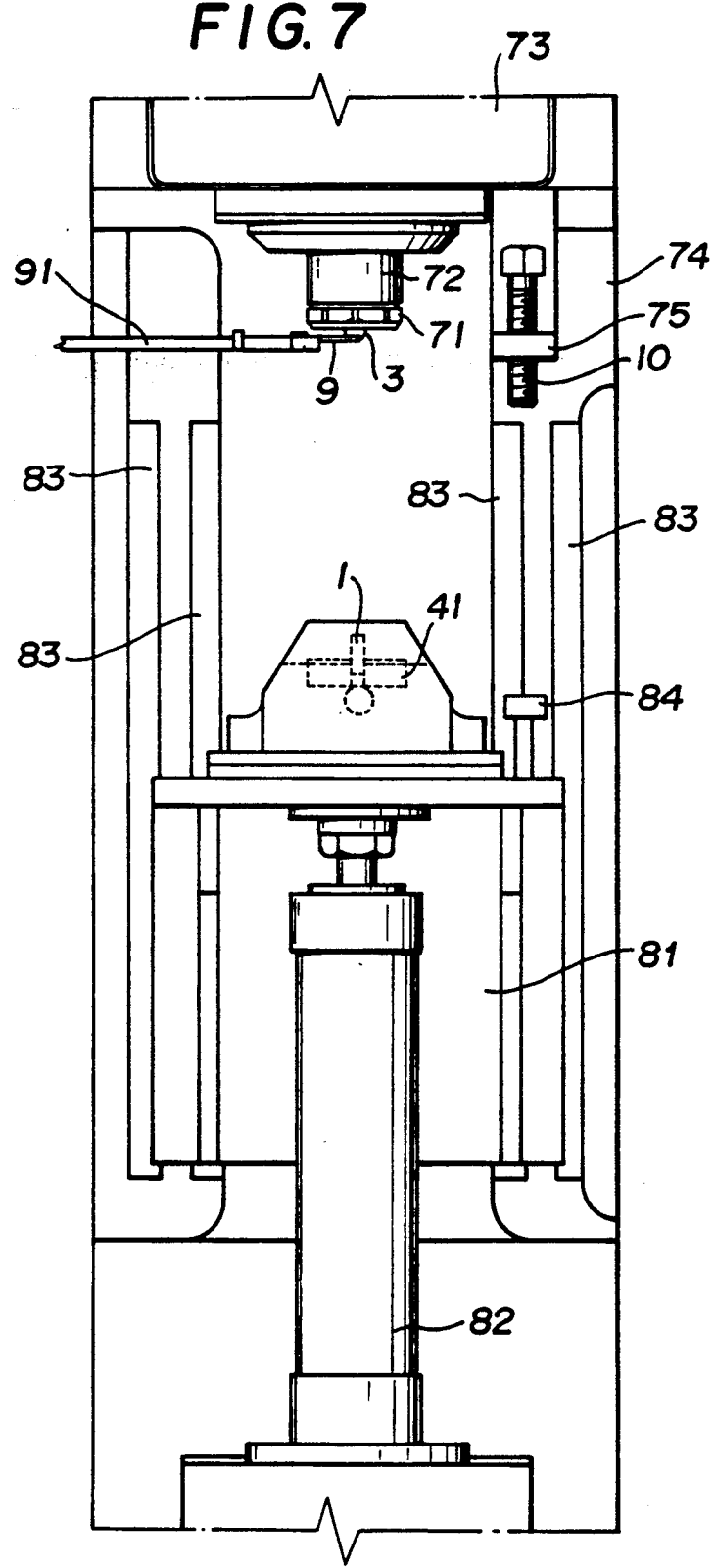
FIG. 7 is a front view of a machine used for the method of the invention.
Figure 8:
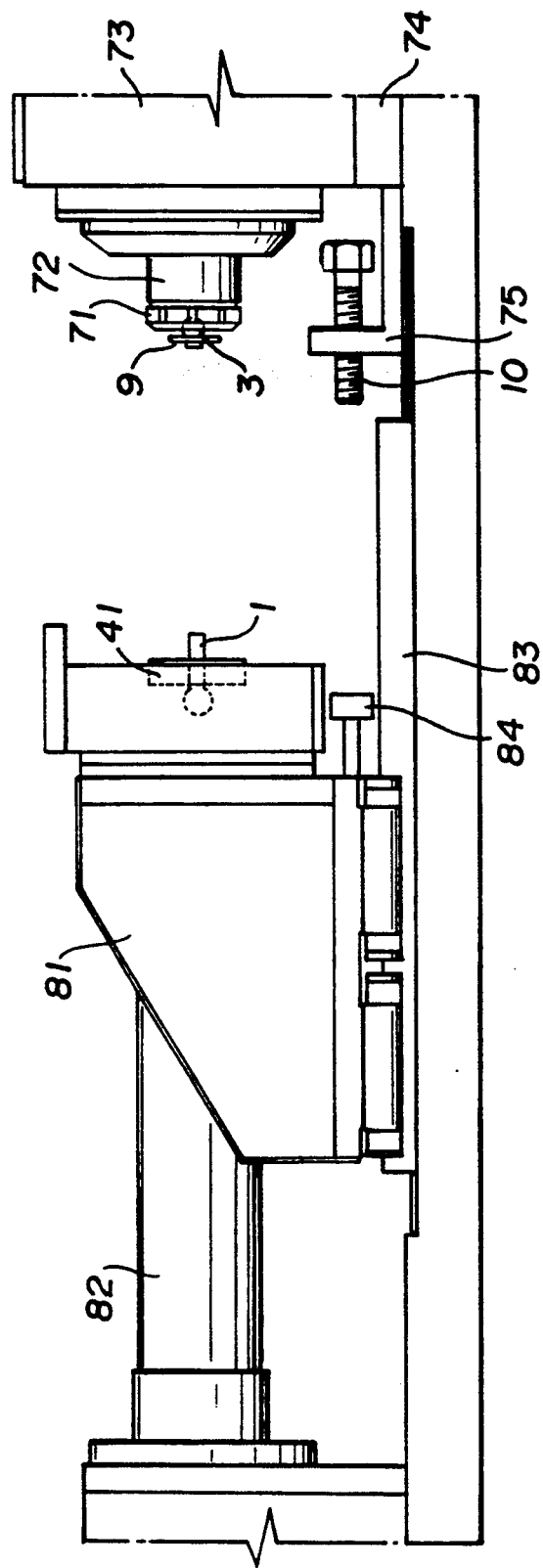
FIG. 8 is a side view of the machine of FIG. 7.
Figure 9:
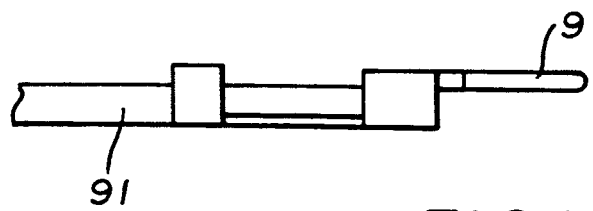
FIG. 9 is a front view of a high frequency heating coil used for the method of the invention.

Then, the rod 1 with the ball section 2 is released from the chuck 41, turned upside down and then clamped again by the chuck 41. FIGS. 7 and 8 illustrate this status. Thereafter, another ball 3 is frictionally welded to the other end of the rod 1 in a manner same as that described above.

Figure 10:
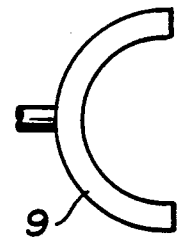
FIG. 10 is a plan view of the high frequency heating coil of FIG. 9.

At this stage, one of the ball sections 2 formed as described above is clamped by the ball holder 71 and the rod 1 is clamped by the chuck 41. Under this condition, a high frequency heating coil 9 is arranged around the neck portion 5 of the rod 1. High frequency coil supporting member 91 which supports the high frequency heating coil 9 is vertically as well as laterally movable in FIG. 7. The high frequency heating coil 9 has a shape of a horse shoe as illustrated in FIG. 10. The neck portion 5 is heated by the high frequency heating coil 9 and softened. When the rod 1 is axially pushed by the cylinder 81 under this condition, it is plastically deformed to slightly shorten its length. When the stopper 10 abuts the stopper abutting section 84, the pressure of the cylinder 81 applied to the neck portion 5 is removed and a ball joint precisely having a length $L_1$ is obtained.

Figure 6:
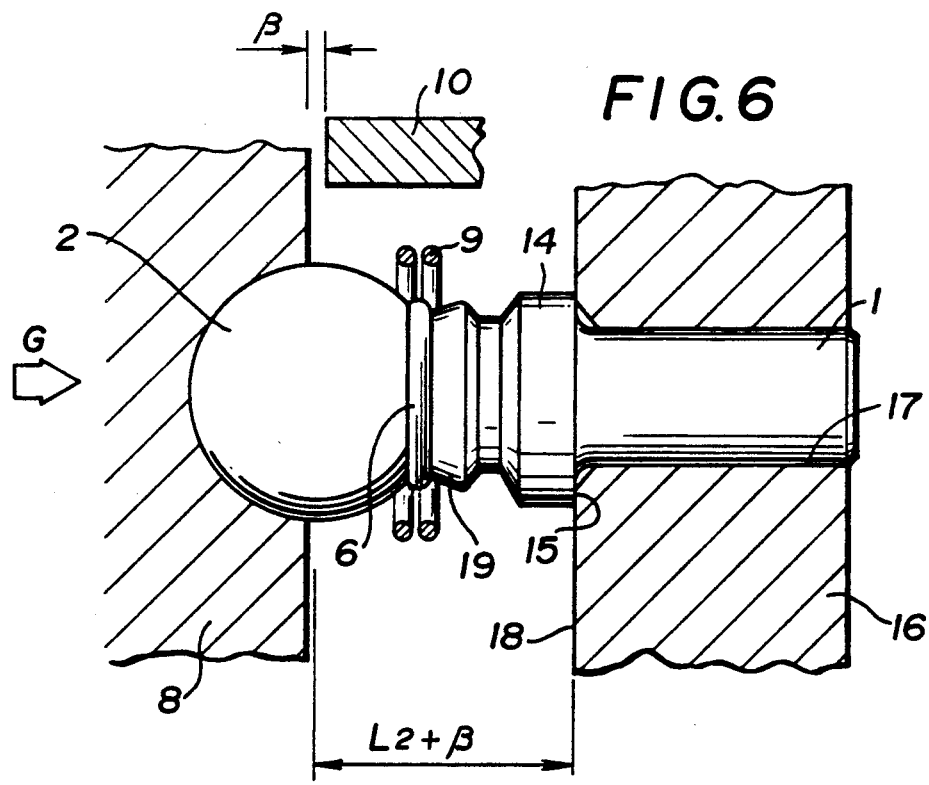
FIG. 6 is a sectional view along the longitudinal axis of the rod end joint of the second embodiment.

FIG. 6 illustrates a second embodiment of the invention, where only one ball section 2 is formed at one end of a rod 1 to form a rod end joint 12. Such a rod end joint 12 is usually called "a studded ball" and includes a rod 1 provided with a threaded section 13 and a flange 14. The ball section 2 is formed at one end of the rod 1 in a manner same as that of the first embodiment as described above. In the rod 1 formed with the ball section 2, the distance between the center of the ball section 2 and an end surface 15 of the flange 14 is slightly longer than $L_2$ of the distance in the final product. In other words, the distance of the rod 1 formed with the ball section 2 in this step is $L_2 + \beta$ as illustrated in FIG. 6. A bulge 6 is usually formed at a neck portion 19. A high frequency annealing and an application of external compressive force G are carried out as in the case of the first embodiment as described above.

According to the second embodiment, the ball section 2 of the unfinished rod end joint is received by a movable press member 8. Then, the rod 1 is inserted into a bore 17 of a stationary press member 16 until said end surface 15 of the flange 14 is pressed to abut to a surface 18 of the stationary press member 16. Thereafter, a high frequency heating coil 9 is arranged around the neck portion 19. A neck portion 19 is heated as described in the first embodiment to soften said neck portion 19. In this case, external compressive force G is applied to the neck portion 19 by the movable press member 8 to compress the unfinished rod end joint until said distance $L_2 + \beta$ is reduced to $L_2$ and a stopper 10 abuts to the movable press member 8. Alternatively, the press member 8 (the member receiving the ball section 2) may be movable while the other press member 16 (the member inserted with the rod 1) may be made to be stationary. The bulge 6 is removed in the manner as described above.

The machine illustrated in FIGS. 7 and 8 may also be used for the second embodiment.

Figure 5:
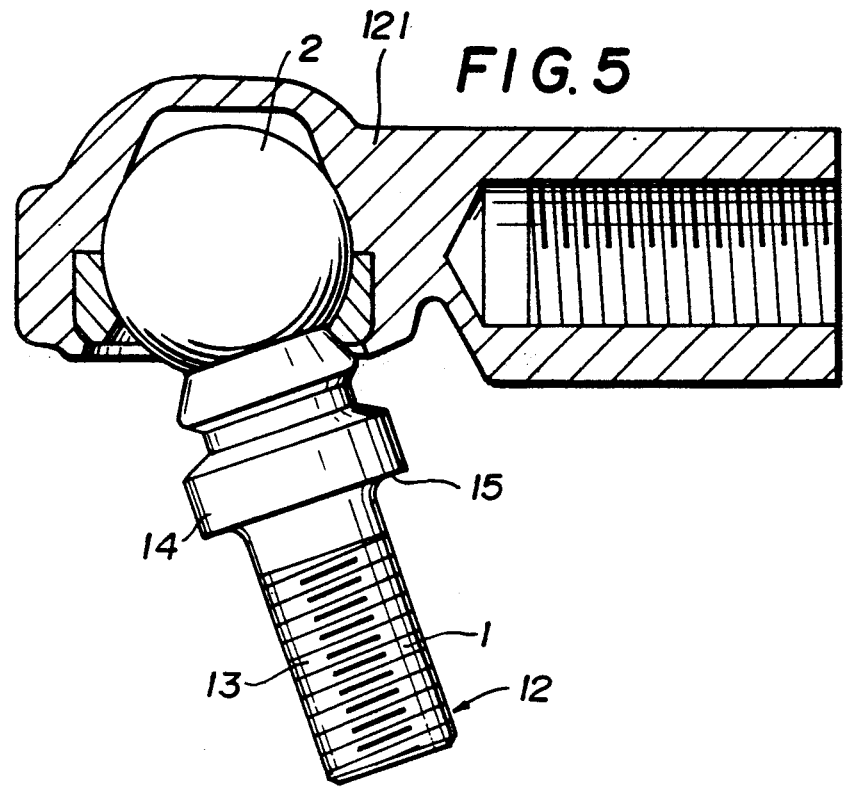
FIG. 5 illustrates another rod end joint prepared in a second embodiment of the invention in actual use.

FIG. 5 shows a sectional view along the longitudinal axis of the rod end joint 12 of the second embodiment in an actual use. The rod end joint 12 comprises a rod 1 and a ball section 2 formed at an end of the rod. The rod end joint 12 and a special die-cast zinc alloy body 121 constitute a spherical sliding bearing. The spherical sliding bearings of this type are widely used in link mechanisms such as an automobiles, construction, farm and packaging machinery, etc. and transmit power smoothly.

As is apparent from the above description, the method according to the invention can provide a rod end joint with longitudinal dimensions accurately and inexpensively without any difficulty. Since the compressive force is applied longitudinally to the rod 1, it is prevented that the diameter of the rod is decreased to reduce the strength of the rod. Besides, the tenacity of the neck portion(s) of the rod end joint is increased by the annealing treatment applied thereto.

What is claimed is:

1. A method of manufacturing a rod end joint comprising a rod and one or more ball sections formed at an end or ends of the rod, said method comprising steps of rigidly fitting a ball or balls to the end or ends of the rod to form the ball section and applying external compressive force longitudinally to a neck portion formed with the ball section while the neck portion is subjected to a high frequency annealing so as to plastically deform said rod.

2. The method according to claim 1, wherein said one or more balls are frictionally welded to said end or ends of the rod.

3. The method according to claim 2, wherein the rod is secured by a stationary member and while the ball is rotated, external force is longitudinally applied between the ball and the rod along the axis of the rod so as to rigidly fit the ball to the end of the rod.

4. The method according to claim 1, wherein a length of the rod before the ball is fitted is greater than a length of the rod of a final product.

5. The method according to claim 1, wherein said rod is made of steel and heated by a high frequency heater to a temperature between 670° and 720° C.

6. The method according to claim 1, further comprising a step of removing bulges formed during the step of frictional welding.

* * * * *